Figure 1:
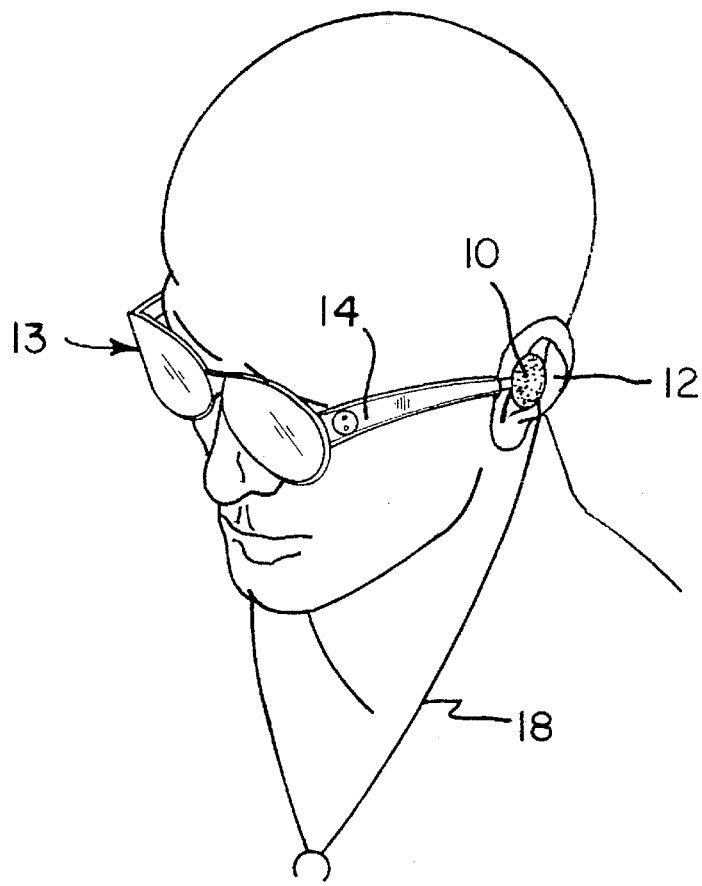

United States Patent [19]

Ballein

[11] Patent Number: 5,579,400
[45] Date of Patent: Nov. 26, 1996

[54] HEADPHONES

[76] Inventor: Burkhard Ballein, Gronaustrasse 59, D-42285 Wuppertal, Germany

[21] Appl. No.: 349,456

[22] Filed: Dec. 5, 1994

Related U.S. Application Data

[63] Continuation of Ser. No. 91,895, Jul. 14, 1993, abandoned.

[30] Foreign Application Priority Data

Jul. 17, 1992 [DE] Germany .......................... 42 23 515.4

[51] Int. Cl.$^6$ .................................................. H04R 25/00
[52] U.S. Cl. .......................... 381/183; 381/187; 381/68.5
[58] Field of Search ............................. 351/41, 158, 123, 351/111; 381/25, 68.5, 183, 187, 68.3, 68.6, 68.7, 68.1, 68, 69; 345/8

[56] References Cited

U.S. PATENT DOCUMENTS

| | | | |
|---|---|---|---|
| 2,765,373 | 10/1956 | Smith | 381/68.5 |
| 2,962,562 | 11/1960 | McCarrell | 381/68.5 |
| 3,049,974 | 8/1962 | Miwa | 351/41 |
| 3,238,309 | 3/1966 | Christofferson | 381/68.5 |
| 4,634,816 | 1/1987 | O'Malley et al. | 381/187 |
| 4,875,233 | 10/1989 | Derhaag et al. | 381/183 |
| 4,901,355 | 2/1990 | Moore | 381/183 |
| 4,904,078 | 2/1990 | Gorike | 381/68.1 |
| 5,033,094 | 7/1991 | Hung | 381/187 |
| 5,117,465 | 5/1992 | MacDonald | 381/187 |
| 5,276,471 | 1/1994 | Yamauchi et al. | 351/153 |

FOREIGN PATENT DOCUMENTS

| | | | |
|---|---|---|---|
| 0537556 | 5/1922 | France | 381/68.5 |
| 1563892 | 3/1969 | France . | |
| 1272377 | 7/1968 | Germany . | |
| 3507397A1 | 9/1985 | Germany . | |
| 3507397 | 9/1985 | Germany | 381/68.5 |
| 8617136 | 8/1986 | Germany . | |
| 8806490 | 5/1989 | Germany . | |
| 4223515C1 | 2/1994 | Germany | H04R 1/10 |
| 0307425 | 12/1988 | Japan | 351/111 |
| 0677916 | 8/1952 | United Kingdom | 381/68.5 |
| 2206014 | 6/1988 | United Kingdom . | |

Primary Examiner—Curtis Kuntz
Assistant Examiner—Huyen D. Le
Attorney, Agent, or Firm—Darby & Darby, P.C.

[57] ABSTRACT

Headphones with two receivers, which can be inserted, each preferably surrounded by a foam pad, into the two auricles of the user and fixed with a hoop, and the hoop, which fixes the two receivers in the auricles of the user, is formed by spectacles, the two receivers being fixed to the free ends of the side pieces and the free ends of the side pieces running essentially in a straight line to the center of the auricles.

16 Claims, 3 Drawing Sheets

HEADPHONES

This is a continuation of application Ser. No. 08/091,895, filed Jul. 14, 1993, now abandoned.

The invention relates to headphones with two receivers, which can be inserted, each preferably surrounded by a foam pad, into the two auricles of the user and fixed with a hoop.

These known headphones are usually used for portable radios and/or playback equipment. The two receivers, which can be inserted in the auricles of the user, are used with a hoop, which lies on the upper side of the head. However, the appearance of the user is affected by this hoop and the putting on of hats, caps, etc. is hindered.

It is an object of the invention to improve headphones of the initially described type further and, in particular, to do without the hoop, the receivers nevertheless being fixed reliably in the auricles of the user.

Pursuant to the invention, this objective is accomplished owing to the fact that the hoop, fixing the two receivers in the auricles of the user, is formed by spectacles, the two receivers being fixed at the free ends of the side pieces and the free ends of the side pieces running essentially in a straight line to the center of the auricles. The two receivers of the headphones are thus held reliably in the auricles of the user with the side pieces of the spectacles. The spectacles can be sunglasses or also prescription glasses. The two receivers are attached to the free ends of the side pieces and, after the receivers are inserted in the auricles of the user, at the same time also hold the spectacles. The free ends of the side pieces run essentially in a straight line to the center of the auricle, so that the side pieces also no longer have to lie upon the auricles.

The two side pieces can have seats for snapping in the receivers. The receivers can be fastened simply to the side pieces by snapping them in.

The receiver can consist of a basic part with a cover plate and an inserted electro-acoustic transducer. The electro-acoustic transducer is thus inserted easily into a basic part with a cover plate that can be snapped in and thus can be produced and installed inexpensively.

The basic part of the receiver can be adjustably snapped with a spherical projection into a correspondingly shaped seat of the side piece. By these means, the receiver is adjustably attached to the side piece in a simple and reliable manner.

The side piece, linked with a hinge to the rim of the spectacles, can be fastened with a screw, which enables the slope of the side piece to be adjusted, to its hinge part. By these means, an adaptation to the user by simple means is possible by adjusting the slope of the side pieces with respect to the rim.

The side piece can be constructed in two parts with overlapping regions for adjusting its length. By these means, adaptation to the user is also possible, since the length of the side pieces can be adapted easily to the user.

The part of the side piece holding the receiver can be movably fixed in a longitudinal groove in a second part of the side piece. By shifting the one part of the spectacles in the longitudinal groove of the second part of the side piece, the length of the side piece can be adapted easily to the user.

Figure 2:
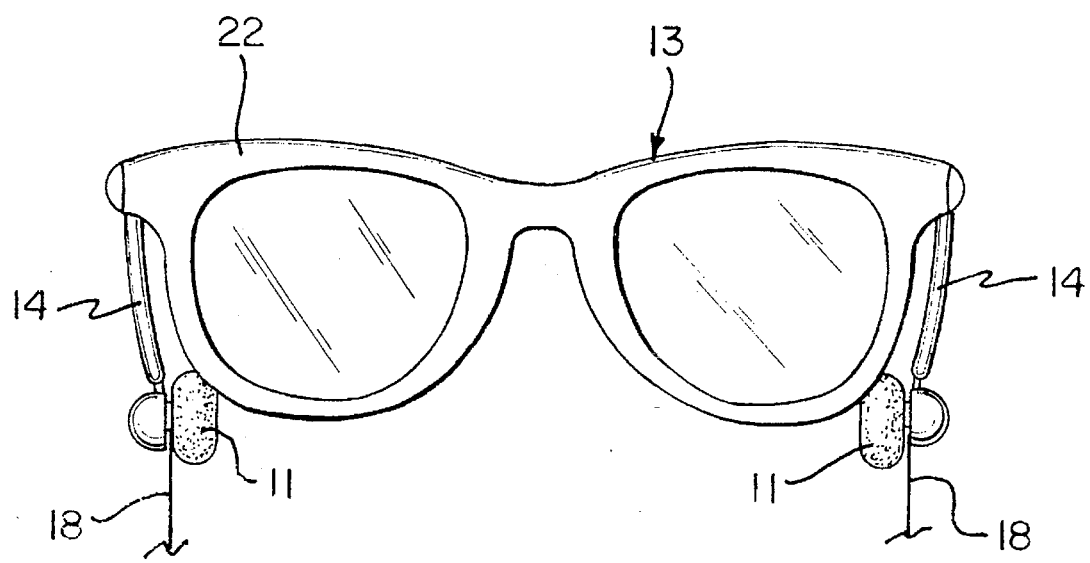
Figure 3:
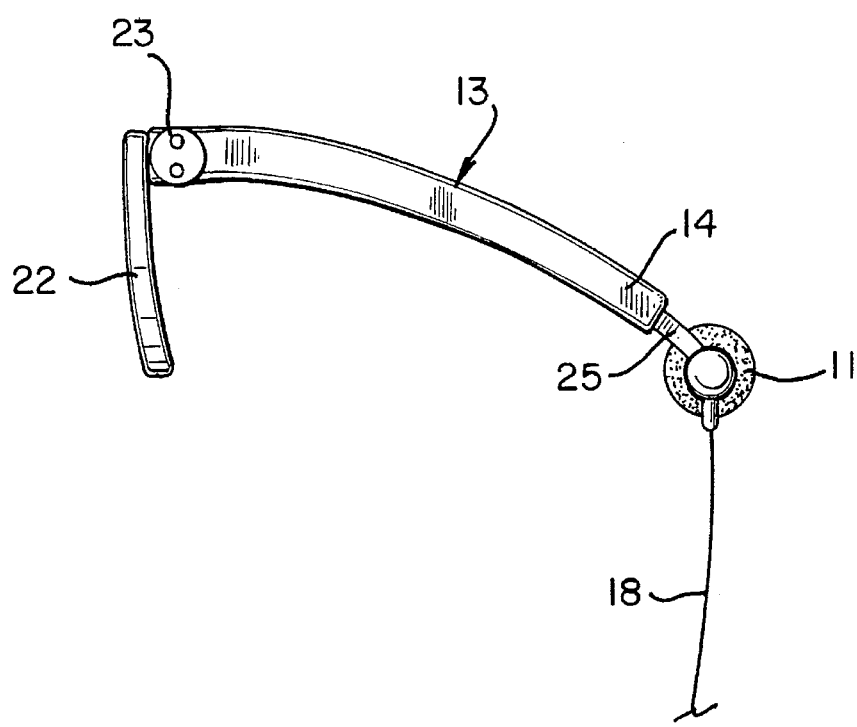
Figure 4:
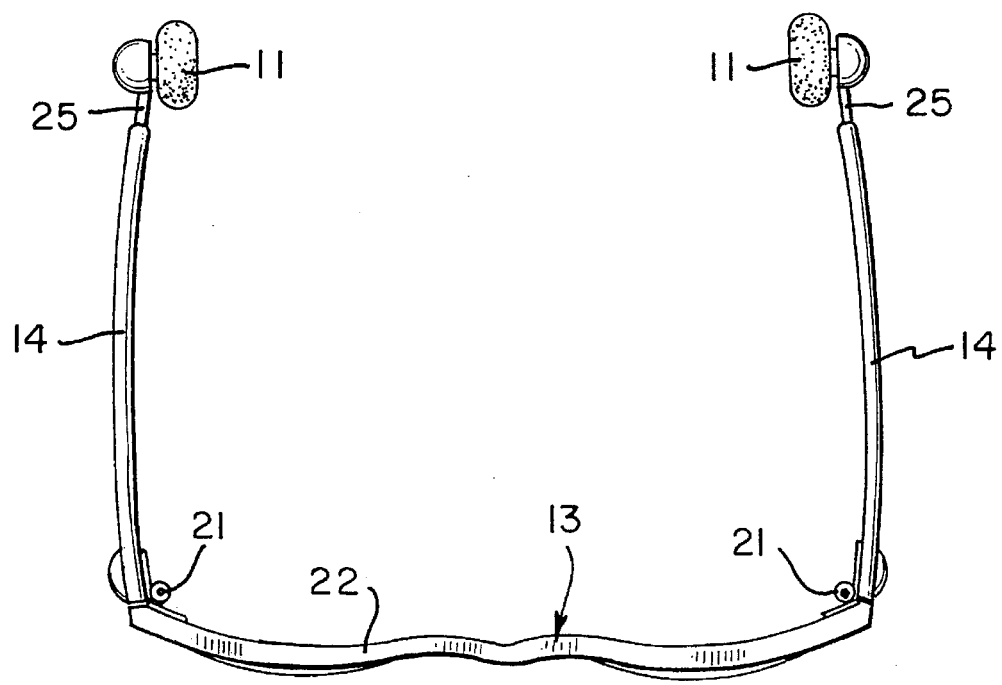
Figure 5:
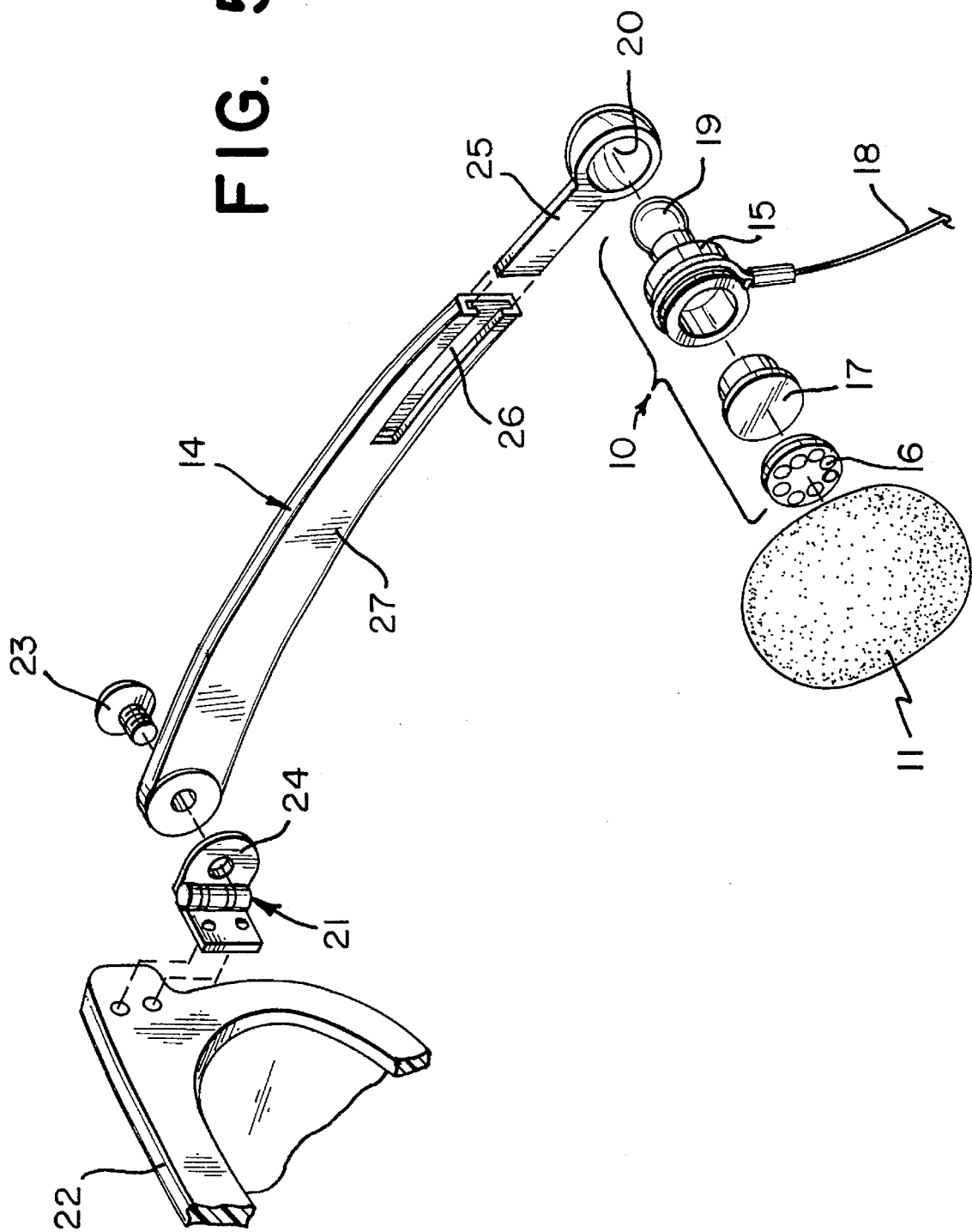

An embodiment of the invention is shown in the drawings, in which:

FIG. 1 shows an inventive receiver in a diagrammatic representation in the operating position with the head of the user, FIG. 2 shows the inventive receiver in a front view, FIG. 3 shows the inventive receiver in a side view, FIG. 4 shows the inventive receiver in a plan view, and FIG. 5 shows the inventive receiver in an exploded representation.

The inventive headphone has two receivers 10 which, surrounded by a foam pad 11, can be inserted in the two auricles 12 of the user and can be fixed with a hoop formed by spectacles 13. As can be seen particularly from FIG. 5, the two receivers 10 are fixed to the free ends of the side pieces 14. The free ends of the side pieces 14 run essentially linearly to the center of the auricles 12. The spectacles can be constructed as sunglasses or as prescription glasses and hold the receivers 10 in the auricles 12 of the user in a simple and reliable manner.

As can furthermore be inferred from FIG. 5, the receiver 10 consists of a basic part 15 with a cover plate 16, which can be snapped in and into which the electro-acoustic transducer can be inserted. The connecting cables 18 are fixed to the basic part 15 which, in a manner not shown, has contacts in the interior for the electro-acoustic transducer.

The basic part 15 of the receiver 10 is adjustably snapped with a spherical projection 19 into a correspondingly shaped seat 20 of the side piece 14. By these means, easy installation is possible and the receiver 10 can be adjusted to a limited extent in a simple manner to fit the auricle 12 of the user opposite the side piece 14.

As shown in FIGS. 3 and 4, the rim 22 is located in a first vertical plane which runs perpendicular to a second vertical plane containing the left side piece 14 and a third vertical plane containing the right side piece 14.

The side piece 14, linked with a hinge 21 to the rim 22 of the spectacles, can be fastened with a screw 23, which enables the slope of the side piece to be adjusted, to its hinge part. Thus, the left and right side pieces arms are pivotable into different angular positions in the second and third vertical planes which lie generally perpendicular to the first vertical plane. By these means, a simple adaptation of the spectacles to the user is possible, since the slope of the side pieces 14 with respect to the rim 22 can be adjusted by loosening the screw 23.

For furthermore adapting the spectacles to the user, the side piece 14 can also be constructed in two parts with overlapping regions for adjusting the length. For this purpose, as can be seen particularly from FIG. 5, the part 25 of the side piece 14 carrying the receiver 10 is movably fixed in a longitudinal groove 26 in the second part 27 of the side piece.

As already mentioned, the embodiment shown is merely one example of the realization of the invention, which is not limited to this example. Rather, various other embodiments and modifications are possible. For example, the connecting cable 18 could also lead to only a single receiver and a cable could lead from the receiver, provided with the connection cable, to the second receiver, this cable being led along the two side pieces 14 and the rim 22. Furthermore, the slope of the side piece 14 could also be adjusted with the screw 23 in such a manner, that the side piece 14 lies on the ear of the user. This is necessary particularly when the spectacles 13 are to be used without receivers 10. The screw 23, which adjusts the slope, can also be disposed at a distance from the hinge 21.

I claim:

1. Eyeglass headphones comprising:
    a frame containing two eyeglass lenses, the frame having a left end and a right end, the frame and lenses lying generally in a first vertical plane;
    a left eyeglass arm both hingedly and pivotally attached at a first end to the left end of the frame, the left eyeglass arm being hingedly movable between a first wearing position and a second storage position, and the left eyeglass arm further being pivotable into different angular positions in a second vertical plane generally perpendicular to the first vertical plane;

a right eyeglass arm both hingedly and pivotally attached at a first end to the right end of the frame, the right eyeglass arm being hingedly movable between a first wearing position and a second storage position, and the right eyeglass arm further being pivotable into different angular positions in a third vertical plane generally perpendicular to the first vertical plane;

wherein each of the left and right eyeglass arm extends to the center of an ear of a user when the eyeglass headphones are worn by the user; and a pair of electroacoustic receivers each mounted to a second end of the left and right eyeglass arms, respectively, each of the receivers adapted to be inserted within an outer ear of the user and being the only means of securing the second ends of said arms to the user when the eyeglass headphones are worn by the user.

2. The headphones of claim 1 wherein the left and right eyeglass arms have seats for snapping in the receivers.

3. The headphones of claim 2 wherein the receivers comprise a base part with a cover plate and art inserted electro-acoustic transducer.

4. The headphones of claim 2 wherein the base part of each of the receivers is adjustably snapped with a spherical projection into a correspondingly shaped seat of the left and right eyeglass arms.

5. The headphones of claim 2 wherein the first ends of the left and right eyeglass arms are pivotably attached to the left end and right end of the frame respectively with a screw.

6. The headphones of claim 2 wherein each of the left and right eyeglass arms is constructed in two parts with overlapping regions for adjusting its length.

7. The headphones of claim 2 wherein a part of each of the left and right eyeglass arms carrying the receiver is adjustably fixed in a longitudinal groove in a second part of each of the left and right eyeglass arms respectively.

8. The headphones of claim 1 wherein the receivers comprise a base part with a cover plate and art inserted electro-acoustic transducer.

9. The headphones of claim 8 wherein the base part of each of the receivers is adjustably snapped with a spherical projection into a correspondingly shaped seat of the left and right eyeglass arms.

10. The headphones of claim 8 wherein the first ends of the left and right eyeglass arms are pivotably attached to the left end and right end of the frame respectively with a screw.

11. The headphones of claim 8 wherein each of the left and right eyeglass arms is constructed in two parts with overlapping regions for adjusting its length.

12. The headphones of claim 8 wherein a part of each of the left and right eyeglass arms carrying the receiver is adjustably fixed in a longitudinal groove in a second part of each of the left and right eyeglass arms respectivley.

13. The headphones of claim 1 wherein the base part of each of the receivers is adjustably snapped with a spherical projection into a correspondingly shaped seat of the left and right eyeglass arms.

14. The headphones of claim 1 wherein the first ends of the left and right eyeglass arms are pivotably attached to the left end and right end of the frame respectively with a screw.

15. The headphones of claim 1 wherein each of the left and right eyeglass arms is constructed in two parts with overlapping regions for adjusting its length.

16. The headphones of claim 1 wherein a part of each of the left and right eyeglass arms carrying the receiver is adjustably fixed in a longitudinal groove in a second part of each of the left and right eyeglass arms respectively.

\* \* \* \* \*